United States Patent
Hernandez

(10) Patent No.: US 10,349,115 B2
(45) Date of Patent: Jul. 9, 2019

(54) MULTIMEDIA CONTENT MANAGEMENT SYSTEM AND METHOD OF DISPLAYING REMOTELY HOSTED CONTENT

(71) Applicant: Brian Hernandez, Scottsdale, AZ (US)

(72) Inventor: Brian Hernandez, Scottsdale, AZ (US)

(*) Notice: Subject to any disclaimer, the term of this patent is extended or adjusted under 35 U.S.C. 154(b) by 8 days.

(21) Appl. No.: 15/713,580

(22) Filed: Sep. 22, 2017

(65) Prior Publication Data

US 2018/0014059 A1 Jan. 11, 2018

Related U.S. Application Data

(63) Continuation-in-part of application No. 13/862,007, filed on Apr. 12, 2013, now abandoned.

(51) Int. Cl.
H04N 21/00 (2011.01)
H04N 21/433 (2011.01)
H04N 21/234 (2011.01)
H04N 21/61 (2011.01)
H04N 21/222 (2011.01)
H04N 21/422 (2011.01)
H04N 21/414 (2011.01)
(Continued)

(52) U.S. Cl.
CPC ....... *H04N 21/433* (2013.01); *H04N 21/2223* (2013.01); *H04N 21/234* (2013.01); *H04N 21/2393* (2013.01); *H04N 21/23113* (2013.01); *H04N 21/2743* (2013.01); *H04N 21/41407* (2013.01); *H04N 21/4223* (2013.01); *H04N 21/42204* (2013.01); *H04N 21/6125* (2013.01); *H04N 21/6175* (2013.01)

(58) Field of Classification Search
CPC ......... H04N 21/23113; H04N 21/2393; H04N 21/2743; H04N 21/4223; H04N 21/433; H04N 21/6175; H04N 21/6125; H04N 21/2223; H04N 21/42204; H04N 21/41407; H04N 21/234
See application file for complete search history.

(56) References Cited

U.S. PATENT DOCUMENTS 6,256,059 B1 * 7/2001 Fichtner ............... H04N 5/232
348/222.1
6,847,334 B2 * 1/2005 Hayhurst ............. G06F 1/1613
345/1.2

(Continued)

*Primary Examiner* — Maikhanh Nguyen
(74) *Attorney, Agent, or Firm* — Integrity Patent Group, PLC; Charles E. Runyan

(57) ABSTRACT

A multimedia content management system includes a mobile computing device and a backend server. The mobile computing device includes a memory programmed with a mobile application, a processor module, a wireless communication module configured to communicate over a wireless communication link, and a first multimedia device configured to capture a first video and a second video. The mobile application is configured to transmit the first video and the second video over the wireless communication link via the wireless communication module. The backend server is communicably coupled to the mobile computing device via the wireless communications link and configured to execute a persistent internet accessible request protocol for receiving, updating, and storing transmitted videos. The multimedia content management system is useful for hosting and remotely managing multimedia content.

20 Claims, 2 Drawing Sheets

(51) Int. Cl.
*H04N 21/231* (2011.01)
*H04N 21/239* (2011.01)
*H04N 21/2743* (2011.01)
*H04N 21/4223* (2011.01)

(56) References Cited

U.S. PATENT DOCUMENTS

| | | | |
|---|---|---|---|
| 6,995,789 B2 * | 2/2006 | McIntyre | G06Q 30/06 |
| | | | 348/207.1 |
| 7,034,880 B1 * | 4/2006 | Endsley | H04N 1/00132 |
| | | | 348/207.1 |
| 7,188,312 B2 * | 3/2007 | Hsiu-Ping | G06F 16/9577 |
| | | | 715/249 |
| 7,240,077 B1 | 7/2007 | Edelman | |
| 7,373,594 B1 | 5/2008 | Lopez | |
| 7,639,943 B1 | 12/2009 | Kalajan | |
| 8,135,616 B2 * | 3/2012 | Callaghan | G06Q 30/02 |
| | | | 705/14.4 |
| 8,451,994 B2 * | 5/2013 | Abuan | H04N 7/147 |
| | | | 379/102.01 |
| 8,493,353 B2 * | 7/2013 | Blanchflower | G06F 17/30247 |
| | | | 345/173 |
| 8,701,145 B1 * | 4/2014 | Berger | H04N 21/4147 |
| | | | 725/32 |
| 2009/0055755 A1 | 2/2009 | Hicks | |
| 2009/0210514 A1 * | 8/2009 | Davis | H04L 67/2823 |
| | | | 709/219 |
| 2010/0036854 A1 * | 2/2010 | Regan | H04N 5/76 |
| | | | 725/105 |
| 2011/0112909 A1 * | 5/2011 | Singh | G06Q 30/0269 |
| | | | 705/14.66 |
| 2014/0075283 A1 | 3/2014 | Coursol | |
| 2015/0271557 A1 * | 9/2015 | Tabe | H04N 21/4788 |
| | | | 725/14 |

\* cited by examiner

MULTIMEDIA CONTENT MANAGEMENT SYSTEM AND METHOD OF DISPLAYING REMOTELY HOSTED CONTENT

CROSS-REFERENCE TO RELATED APPLICATION(S)

The present application is a Continuation-in-Part and is related to and claims priority to pending U.S. patent application Ser. No. 13/862,007 filed Apr. 12, 2013, which is incorporated by reference herein in its entirety.

BACKGROUND OF THE INVENTION

The following includes information that may be useful in understanding the present disclosure. It is not an admission that any of the information provided herein is prior art nor material to the presently described or claimed inventions, nor that any publication or document that is specifically or implicitly referenced is prior art.

TECHNICAL FIELD

The present invention relates generally to the field of computer programming of existing art and more specifically relates to multimedia hosting services.

RELATED ART

Many individuals use the internet to access information and for communication. An internet hosting service is a service that runs internet servers, allowing organizations and individuals to serve content to the internet. There are various levels of service and various kinds of services offered. A common kind of hosting is web hosting. Most hosting providers offer a combination of services; e-mail hosting, for example. DNS hosting service is usually bundled with domain name registration. Generic kinds of internet hosting provide a server where the clients can run anything they want (including web servers and other servers) and have internet connections with good upstream bandwidth. Internet providers may provide capability for video hosting. Managing of multimedia content may be difficult with present solutions.

SUMMARY OF THE INVENTION

In view of the foregoing disadvantages inherent in the known computer programming art, the present disclosure provides a novel multimedia content management system and method. The general purpose of the present disclosure, which will be described subsequently in greater detail, is to provide a system including a mobile computing device, mobile application, multimedia device, and backend server that is useful for hosting and remotely managing multimedia content.

Many people use the internet as previously mentioned. Internet providers may provide capability for video hosting. It is desirable to provide an internet accessible website providing a computer script that when incorporated into a webpage retrieves and displays a subscriber's remotely hosted video clip/digital image which can be selectively updated with a new video clip/digital image without changing the provided computer script.

It is further desirable for the internet accessible website to provide the subscriber with a downloadable mobile app whereby the subscriber can download the mobile app to a user provided mobile device enabling the subscriber using the mobile device to upload a video clip/digital image from the mobile device to their remotely hosted video clip/digital image account supplanting any previously loaded digital data thereby providing internet businesses with means for daily dynamic webpage imaging, such as restaurants: specials, breakfast, lunch, and dinner video/image data.

A multimedia content management system is disclosed herein. The multimedia content management system includes a mobile computing device and a backend server. The mobile computing device may include communicably coupled together a memory programmed with a mobile application, a processor module configured to execute said mobile application, a wireless communication module configured to communicate over a wireless communication link, and a first multimedia device configured to capture a first video and a second video, the mobile application configured to transmit the first video and the second video over the wireless communication link via the wireless communication module.

The backend server may be communicably coupled to the mobile computing device via the wireless communications link and further configured to execute a persistent internet accessible request protocol, said persistent internet accessible request protocol configured to communicate a stored video to a remote media device over an internet connection and in response to a video request. The backend server may also be configured to receive the first video and to store the first video as the stored video. Further still, the backend server may additionally be configured to receive the second video, to store the second video as the stored video, replacing the first video with the second video.

According to another embodiment, a method of providing video content across a plurality of platforms is also disclosed herein. The method of providing video content across a plurality of platforms includes inserting a call into a remote media device, the call configured to initiate a video request to a persistent internet accessible request protocol executable on a backend server; communicating the first video to the backend server via a wireless communication link; storing the first video in the backend server as a stored video; making the video request for the stored video to the backend server by selecting the call inserted in the remote media device; receiving and playing the first video, by the remote media device; capturing a second video, and communicating the second video to the backend server; storing the second video in the backend server as the stored video, replacing the first video; making the video request for the stored video to the backend server by selecting the call inserted in the remote media device; and receiving and playing the second video, by the remote media device in response to the video request.

For purposes of summarizing the invention, certain aspects, advantages, and novel features of the invention have been described herein. It is to be understood that not necessarily all such advantages may be achieved in accordance with any one particular embodiment of the invention. Thus, the invention may be embodied or carried out in a manner that achieves or optimizes one advantage or group of advantages as taught herein without necessarily achieving other advantages as may be taught or suggested herein. The features of the invention which are believed to be novel are particularly pointed out and distinctly claimed in the concluding portion of the specification. These and other features, aspects, and advantages of the present invention will become better understood with reference to the following drawings and detailed description.

BRIEF DESCRIPTION OF THE DRAWINGS

The figures which accompany the written portion of this specification illustrate embodiments and methods of use for the present disclosure, a multimedia content management system, constructed and operative according to the teachings of the present disclosure.

The various embodiments of the present invention will hereinafter be described in conjunction with the appended drawings, wherein like designations denote like elements.

DETAILED DESCRIPTION

Figure 1:
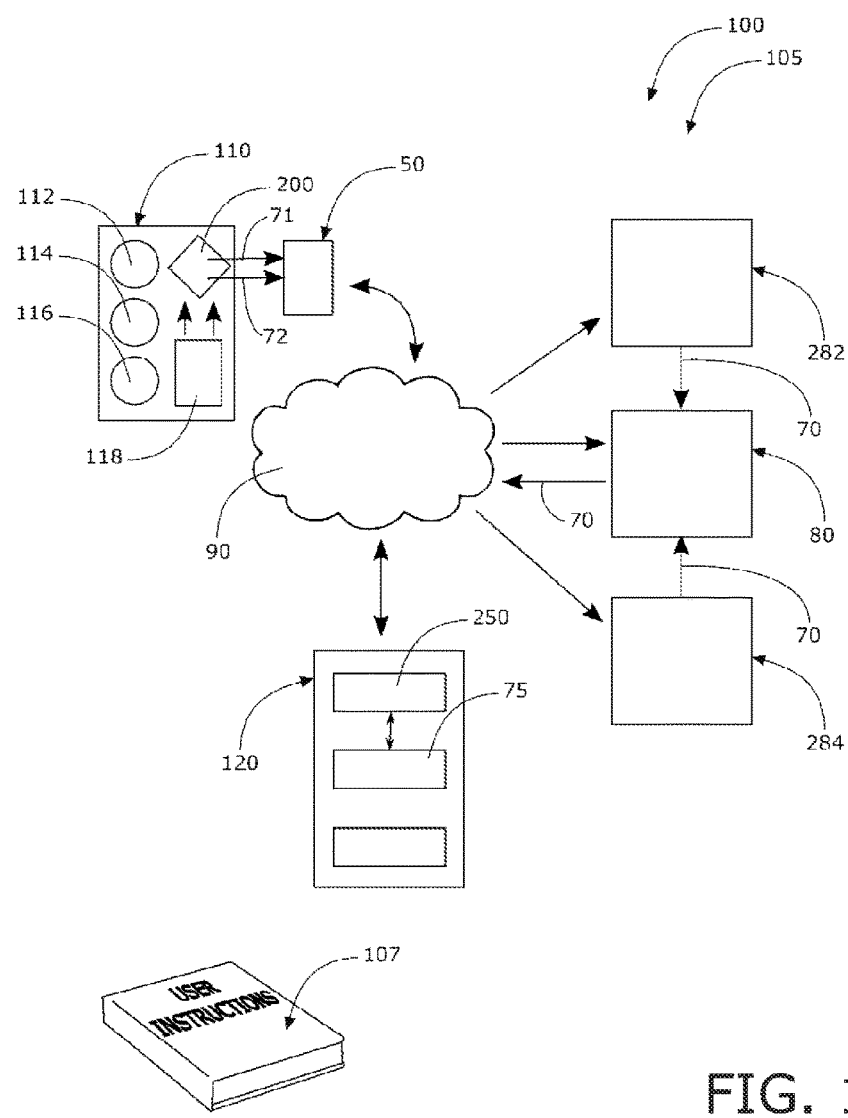
FIG. 1 is a schematic diagram of the multimedia content management system showing the interaction of components included in the system, according to an embodiment of the disclosure.

As discussed above, embodiments of the present disclosure relate to computer programming and more particularly to a multimedia content management system as used to improve the hosting, distribution and remote management of multimedia content.

Generally, the present invention is used to provide a system, method, and apparatus whereby users having websites incorporating video clips or digital images are provided a dynamic method of displaying new website content through hosting of image content data, performed only once incorporating into a subscriber's website the resource locator code for the subscriber's hosted image content data, downloading an image content data app to a subscriber provided mobile device with the app forming subscriber graphical user interface (GUI) for managing and editing their image content data whenever desired with the new image content data file overlaying the old therein enabling the website with dynamic imaging that doesn't require website change to effect display of subscriber's new image content data.

The present invention is used to provide hosting for subscriber image content data having image content data storage with a resource identifier code that is incorporated only once into a portion of a website of the subscriber enabling remote access to subscriber's hosted image content data.

Another object of the present invention is to provide hosting for subscriber image content data storage and downloadable app providing subscriber (GUI) for accessing and modifying their hosted image content data storage with new content using their mobile device.

Still yet another object of the present invention is to provide a method for generating dynamic imaging for a portion of a user's website whereby the internet accessible hosting website further provides subscriber account access through passcode and GUI for subscriber data management.

An additional object of the present invention is to provide hosting for a method for generating dynamic imaging for a portion of a user's website wherein the internet accessible hosting website provides an electronic transmission to a subscriber of the subscriber's resource locator code that is to be added into the subscriber's website for all future remote retrieval of the subscriber's image content data from the subscriber's image content data storage.

A further object of the present invention is to provide a method for generating dynamic imaging for a portion of a user's website where the image content data is user provided that can be overlaid with new subscriber content through the mobile device app GUI as desired by the subscriber.

A yet further object of the present invention is to provide a method for generating dynamic imaging for a portion of a user's website wherein the image content data is a digital image, photo, video clip, or similar content.

A still yet further object of the present invention is to provide a method for generating dynamic imaging for a portion of a user's website wherein said user provided mobile device is a camera, smartphone, cell phone, computer, portable computer, tablet computer or similar devices enabled both with a camera and internet capable.

Another object of the present invention is to provide a method for generating dynamic imaging for a portion of a user's website, the method optionally providing an image content data storage having a plurality of image content data files where then downloading and installing the hosting provider's app into a subscriber's provided mobile device provides GUI means for subscriber content data storage management, whereby the subscriber can upload a plurality of image content data files to their hosted image content data storage with GUI means for displaying one or more image data files whenever desired therein enabling the website with dynamic imaging that doesn't require website change to effect display of subscriber new image content data.

Yet another object of the present invention is to provide a method for generating dynamic imaging for a portion of a user's website where the internet accessible hosting website further provides for electronic transmission to a subscriber of the subscriber's resource locator code and optionally a script that is to be embedded into the subscriber's website for all future remote retrieval of the subscriber's image content data from the subscriber's image content data storage for retrieving and displaying a plurality of image control data files.

Still yet another object of the present invention is to provide a method for generating dynamic imaging for a portion of a user's website where the image content data is user provided and uploaded to the subscriber's image content library whereby the subscriber can delete, edit and queue one or more image content data files within the subscriber's image content storage library.

Additional objects of the present invention may appear as the description proceeds. The present invention overcomes the shortcomings of the prior art by providing a system and method of generating dynamic website imaging for users having websites incorporating website hardcoded video clip or digital image links, are provided a dynamic method of displaying new website content through hosting of image content data, —performing only once—incorporating into a subscriber's website the resource locator code for the subscriber's hosted image content data, downloading an image content data app to a subscriber provided mobile device with the app forming subscriber GUI for managing and editing their multimedia content data.

The present invention may further be configured to include an application programming interface (API) for integrating and facilitating elements of the multimedia content management system with other digital content platforms. Parts of the API may include methods or protocol for seamlessly adapting and distributing select digital content to a plurality of platforms across multiple platforms or directories from a control channel. This control channel may be configured in the multimedia content management system as a login and password portal within the system as an element of the mobile application or backend server. This may provide a basis for expanding the scope and functionality of the multimedia content management system as digital content platforms and channels continue to evolve.

Some digital content captured for distribution through the multimedia content management system may be limited in size. This maximum size may be configured directly through the included backend server as a predetermined timeframe that shared video content is permitted to run. Other embodiments of this system may include upgradeable accounts or service packages that allow a user to extend this predetermined timeframe (as regulated by the backend server) in order to share additional digital content (including videos, audio files, images, photos, renderings, and the like) that exceeds the initial predetermined timeframe established through the system.

An additional object of the present invention may be to provide a system and method for allowing shared digital content to be integrated with or interact with multimedia items not stored on the included backend server. Such interactions may occur when video requests are made from outside remote media devices that may be directed to other multimedia content related to the shared digital content provided by a user. Yet another example may occur when a user on a differing media or network platform makes a content request that is filtered and integrated with digital content metadata outside of the multimedia content management system. This filtered content request may be directed to or combined with supplementary multimedia requests that may be directed to a shared item within the multimedia content management system. In one embodiment, a user of the multimedia content management system may permit a shared item to integrate with this supplementary multimedia request. An example of this may be when a user is navigating through directories, applications, platforms, or other networks that function to combine multiple users based upon location, preferences, and/or backgrounds.

In one embodiment, the multimedia content management system may comprise a mobile computing device, the mobile computing device including communicably coupled together a memory programmed with a mobile application. The mobile computing device may also include a processor module configured to execute said mobile application. In one embodiment, the mobile computing device of this system may be configured as a telephony device, which may further include a digital camera.

Further still, the mobile computing device may include a wireless communication module configured to communicate over a wireless communication link, and a first multimedia device configured to capture a first video and a second video. In addition, the mobile application may be configured to transmit the first video and the second video over the wireless communication link via the wireless communication module.

The multimedia content management system may also comprise a backend server communicably coupled to the mobile computing device via the wireless communications link. The backend server may be configured to execute a persistent internet accessible request protocol, the persistent internet accessible request protocol configured to communicate a stored video to a remote media device over an internet connection and in response to a video request.

The backend server may also be configured to receive the first video, and to store the first video as the stored video. On the backend server, the stored video may be limited to a maximum duration, where the maximum duration may be predefined or configured by the backend server. In addition, the backend server may also be configured to augment or extend the maximum duration by a predefined timeframe. This extension may allow the system to provide additional storage or digital content sharing capabilities for a user as an upgrade option or alternative configuration. Further still, the backend server may be configured to receive the second video, to store the second video as the stored video, replacing the first video with the second video.

The multimedia content management system may further comprise a second multimedia device configured to capture a third video, and further configured to transmit the third video to the backend server. The persistent internet accessible request protocol may further be configured to receive the third video, to store the third video as the stored video, replacing the second video with the third video.

The video request of the remote media device may be made via a first social media platform or a second social media platform. The persistent internet accessible request protocol may be further configured to adapt the stored video communicated over the internet connection to the second social media platform. The persistent internet accessible request protocol may also be configured to integrate the stored video with a multimedia item not stored on the backend server. This may allow the system to further expand in scope with growing technology needs, expanding platform functionality, and network developments. The persistent internet accessible request protocol may also include an application programming interface (API) configured to adapt the persistent internet accessible request protocol, wherein the API may be further configured to integrate the stored video on differing network platforms.

Figure 2:
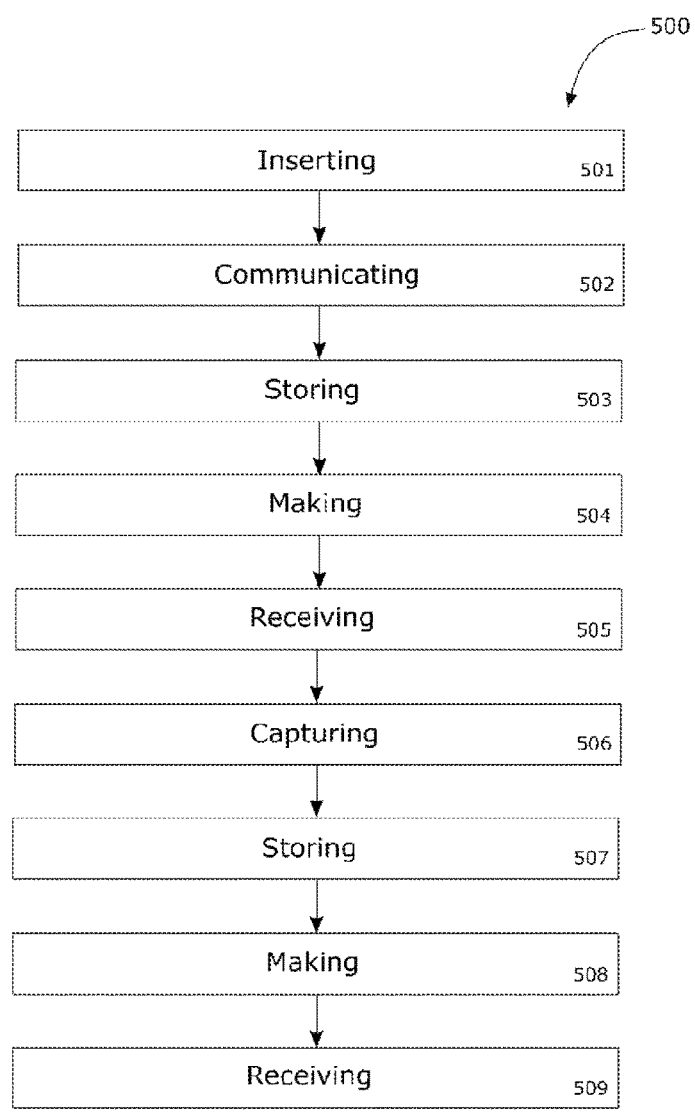
FIG. 2 is a flow diagram illustrating a method of providing video content across a plurality of platforms, according to an embodiment of the present disclosure.

Referring now more specifically to the drawings by numerals of reference, there is shown in FIGS. 1-2, various views of a multimedia content management system 100.

FIG. 1 shows a multimedia content management system 100, according to an embodiment of the present disclosure. Here, the multimedia content management system 100 may be beneficial for use by a user for hosting and remotely managing multimedia content. As illustrated, the multimedia content management system 100 may include a mobile computing device 110 including communicably coupled together a memory 112 programmed with a mobile application 200, a processor module 114 configured to execute the mobile application 200, a wireless communication module 116 configured to communicate over a wireless communication link 50, and a multimedia device 118 configured to capture a first video 71 and a second video 72. The mobile application 200 may be configured to transmit the first video 71 and the second video 72 over the wireless communication link 50 via the wireless communication module 116.

The multimedia content management system 100 may further include a backend server 120 communicably coupled to the mobile computing device 110 via the wireless communications link 50, the backend server 120 configured to execute a persistent internet accessible request protocol 250. The persistent internet accessible request protocol 250 may be configured to communicate a stored video 75 to a remote media device 80 over an internet connection 90 and in response to a video request 70. The backend server 120 may also be configured to receive the first video 71, and to store the first video 71 as the stored video 75. Further still, the backend server 120 may be configured to receive the second video 72 and to store the second video 72 as the stored video 75, thereby replacing the first video 71 with the second video 72.

The video request 70 of the multimedia content management system 100 may be executed by a first social media platform 282 configured to communicate through or in conjunction with a remote media device 80 over an internet connection 90. The video request 70 of the multimedia content management system 100 may also be executed by a second social media platform 284 configured to communicate through or in conjunction with a remote media device 80 over an internet connection 90.

According to one embodiment, the multimedia content management system 100 may be arranged as a kit 105. In particular, the multimedia content management system 100 may further include a set of instructions 107. The instructions 107 may detail functional relationships in relation to the structure of the multimedia content management system 100 such that the multimedia content management system 100 can be used, maintained, or the like, in a preferred manner.

FIG. 2 is a flow diagram illustrating a method of providing 500 video content across a plurality of platforms, according to an embodiment of the present disclosure. In particular, the method of providing 500 may include one or more components or features of the multimedia content management system 100 as described above. As illustrated, the method of providing 500 video content across a plurality of platforms may include the steps of: step one 501, inserting a call into a remote media device, the call configured to initiate a video request to a persistent internet accessible request protocol executable on a backend server; step two 502, communicating the first video to the backend server via a wireless communication link; step three 503, storing the first video in the backend server as a stored video; step four 504, making the video request for the stored video to the backend server by selecting the call inserted in the remote media device; step five 505, receiving and playing the first video, by the remote media device; step six 506, capturing a second video, and communicating the second video to the backend server; step seven 507, storing the second video in the backend server as the stored video, replacing the first video; step eight 508, making the video request for the stored video to the backend server by selecting the call inserted in the remote media device; and step nine 509, receiving and playing the second video, by the remote media device in response to the video request.

It should be noted that the steps described in the method can be carried out in many different orders according to user preference. The use of "step of" should not be interpreted as "step for", in the claims herein and is not intended to invoke the provisions of 35 U.S.C. § 112(f). It should also be noted that, under appropriate circumstances, considering such issues as design preference, user preferences, marketing preferences, cost, structural requirements, available materials, technological advances, etc., other methods for the multimedia content management system 100, are taught herein.

The embodiments of the invention described herein are exemplary and numerous modifications, variations and rearrangements can be readily envisioned to achieve substantially equivalent results, all of which are intended to be embraced within the spirit and scope of the invention. Further, the purpose of the foregoing abstract is to enable the U.S. Patent and Trademark Office and the public generally, and especially the scientist, engineers and practitioners in the art who are not familiar with patent or legal terms or phraseology, to determine quickly from a cursory inspection the nature and essence of the technical disclosure of the application.

What is claimed is new and desired to be protected by Letters Patent is set forth in the appended claims:

1. A method of providing video content through an internet accessible multimedia management system including:
   a mobile computing device including communicably coupled together a memory programmed with a mobile application, a processor module configured to execute said mobile application, a wireless communication module configured to communicate over a wireless communication link, and a first multimedia device,
   a backend server communicably coupled to the mobile computing device via the wireless communication link, and
   a remote media device communicably coupled to the backend server;
   the method including:
   capturing a first video by the first multimedia device;
   transmitting the first video to the backend server by the mobile application over the wireless communication link using the wireless communication module;
   storing in the backend server the first video as a stored video;
   establishing on the backend server an executable internet accessible request protocol that responds to a call to the backend server by delivering the stored video;
   inserting the call to the backend server into the remote media device;
   establishing on the remote media device an internet accessible content page for the video content with the call to the backend server to deliver the stored video;
   delivering a first version of the internet accessible content page showing the first video by delivering the internet accessible content page from the remote media device including the stored video from the backend server;
   capturing a second video using the first multimedia device;
   transmitting the second video to the backend server by the mobile application over the wireless communication link using the wireless communication module;
   deleting automatically by the backend server the first video;
   storing in the backend server the second video as the stored video;
   delivering a second version of the internet accessible content page without changing the call to the backend server to deliver the stored video on the remote media device.

2. The method of claim 1 further wherein the inserting the call to the backend server into the remote media device further includes inserting a single command line that will initiate the call to the backend server.

3. The method of claim 1 wherein the internet accessible multimedia management system includes:
   a second mobile computing device including communicably coupled together a second memory programmed with the mobile application, a second processor module configured to execute said mobile application, a second wireless communication module configured to communicate over the wireless communication link, and a second multimedia device;
   the method further comprising:
   capturing a third video by the second multimedia device;
   transmitting the third video to the backend server by the mobile application over the wireless communication link using the second wireless communication module;
   deleting automatically by the backend server the second video;

storing in the backend server the third video as the stored video;

delivering a third version of the internet accessible content page without changing the call to the backend server to deliver the stored video on the remote media device.

4. The method claim 1, wherein the call to the backend server of the remote media device is made via a first social media platform.

5. The method of claim 1, wherein the executable internet accessible request protocol includes an application programming interface (API) configured to adapt the executable internet accessible request protocol.

6. The method of claim 5, wherein the application programming interface is further configured to integrate the stored video on differing network platforms.

7. The method of claim 1 further comprising: setting a maximum duration, by the backend server, for the stored video.

8. The method of claim 7, further comprising: augmenting the maximum duration by a predefined timeframe.

9. The method of claim 1, further comprising: integrating, with the executable internet accessible request protocol, the stored video with a multimedia item not stored on the backend server.

10. The method of claim 1 wherein the first multimedia device includes a digital camera.

11. A method of providing image content through an internet accessible multimedia management system including:
a mobile computing device including communicably coupled together a memory programmed with a mobile application, a processor module configured to execute said mobile application, a wireless communication module configured to communicate over a wireless communication link, and a first multimedia device
a backend server communicably coupled to the mobile computing device via the wireless communication link,
a remote media device communicably coupled to the backend server;

the method including:
capturing a first image by the first multimedia device;
transmitting the first image to the backend server by the mobile application over the wireless communication link using the wireless communication module;
storing in the backend server the first image as a stored image;
establishing on the backend server an executable internet accessible request protocol that responds to a call to the backend server by delivering the stored image;
inserting the call to the backend server into the remote media device;
establishing on the remote media device an internet accessible content page for the image content with the call to the backend server to deliver the stored image;
delivering a first version of the internet accessible content page showing the first image by delivering the internet accessible content page from the remote media device including the stored image from the backend server;

capturing a second image using the first multimedia device;
transmitting the second image to the backend server by the mobile application over the wireless communication link using the wireless communication module;
deleting automatically by the backend server the first image;
storing in the backend server the second image as the stored image;
delivering a second version of the internet accessible content page without changing the call to the backend server to deliver the stored image on the remote media device.

12. The method of claim 11 further wherein the inserting the call to the backend server into the remote media device further includes inserting a single command line that will initiate the call to the backend server.

13. The method of claim 11 wherein the internet accessible multimedia management system includes:
a second mobile computing device including communicably coupled together a second memory programmed with the mobile application, a second processor module configured to execute said mobile application, a second wireless communication module configured to communicate over the wireless communication link, and a second multimedia device;

the method further comprising:
capturing a third image by the second multimedia device;
transmitting the third image to the backend server by the mobile application over the wireless communication link using the second wireless communication module;
deleting automatically by the backend server the second image;
storing in the backend server the third image as the stored image;
delivering a third version of the internet accessible content page without changing the call to the backend server to deliver the stored image on the remote media device.

14. The method claim 11, wherein the call to the backend server of the remote media device is made via a first social media platform.

15. The method of claim 11, wherein the executable internet accessible request protocol includes an application programming interface (API) configured to adapt the executable internet accessible request protocol.

16. The method of claim 15, wherein the application programming interface is further configured to integrate the stored image on differing network platforms.

17. The method of claim 11 further comprising: setting a maximum size, by the backend server, for the stored image.

18. The method of claim 17, further comprising: augmenting the maximum size by a predefined size.

19. The method of claim 11 further comprising: integrating, with the executable internet accessible request protocol, the stored image with a multimedia item not stored on the backend server.

20. The method of claim 11 wherein the first multimedia device includes a digital camera.

\* \* \* \* \*